3,155,208
FLUID-ACTUATED CLUTCH AND BRAKE
Edmond Henry-Biabaud, Paris, France, assignor to Societe Anonyme Andre Citroen, Paris, France, a corporation of France
Filed July 6, 1961, Ser. No. 122,335
Claims priority, application France, Aug. 3, 1960, 834,913, Patent 1,271,662
2 Claims. (Cl. 192—13)

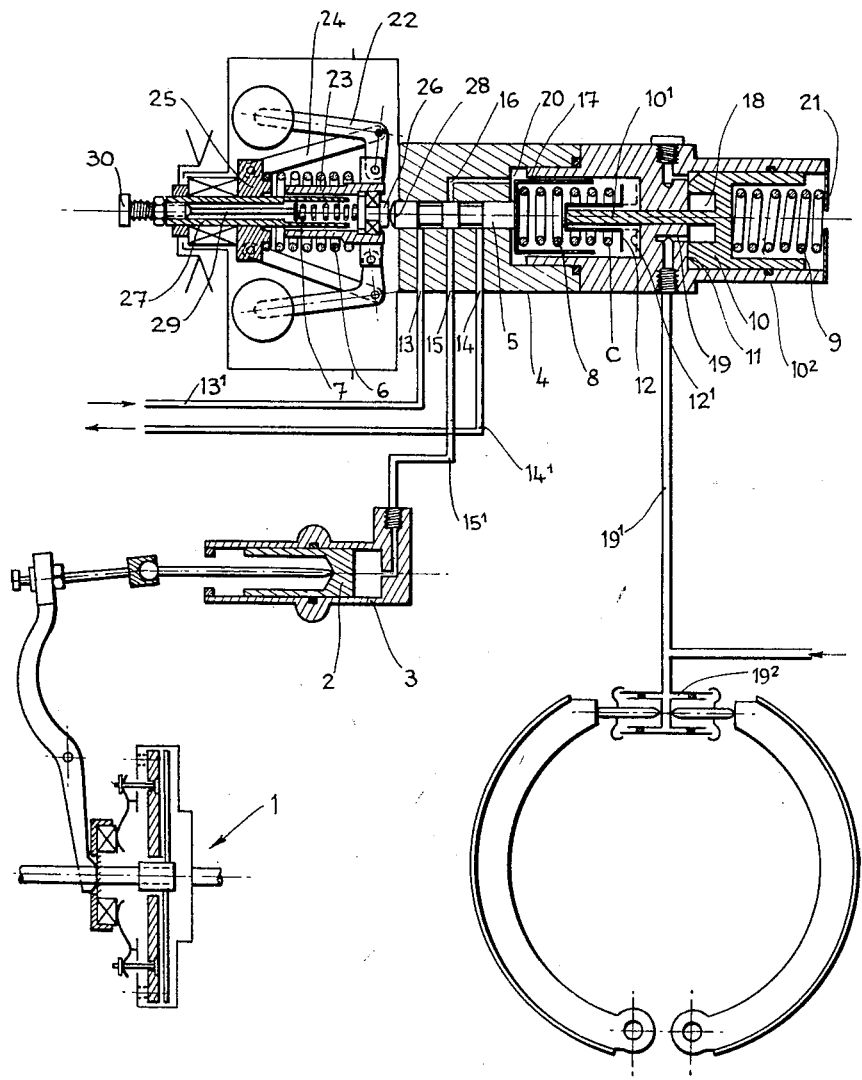

The invention relates to a control device for a hydraulically operated automatic clutch for automobile vehicles.

The automatic control of a clutch should make it possible to regulate the torque which can be transmitted by the clutch, as a function of the speed of rotation of the engine. At the idling speed of the engine, the torque should be zero, and it should be a maximum at about 1200 r.p.m. This speed is not identically the same for all types of vehicles or of engines; it may also vary according to the specific results desired.

The torque should therefore vary progressively from zero to a certain value as a function of the speed of rotation.

This is possible to obtain with the known types of centrifugal clutches.

Another means of obtaining this result with a simple conventional clutch is to regulate the force acting on the clutch fork as a function of the speed of rotation, as the driver does with his foot.

If there is available in a vehicle a hydraulic pressure supply, it is only necessary to control the fork by a piston sliding in a cylinder and to regulate the pressure in this cylinder as a function of the speed of rotation of the engine.

In the applicant's French Patent No. 1,069,199 of December 24, 1952, a device of this kind is described. The "speed signal" is obtained by producing a flow of liquid supplied by a volumetric pump through a jet. The pressure created by the pressure-drop is a function of the speed of rotation. It is this low pressure which is employed to act on a distributor which controls the pressure in the clutch cylinder.

The device provided in accordance with the present invention is different from that of the above-mentioned patent in that it employs a centrifugal regulator to act on the control distributor, and in that a hydraulic device coupled to the braking circuit enables an additional pressure to be obtained in the de-clutching circuit at the moment when the vehicle stops, in order that the de-clutching may be carried out fully and rapidly at the time of stopping.

This device is made necessary by the inevitable existence of friction in the whole mechanical control of the clutch, which requires that the pressure to be supplied in the de-clutching sense must be necessarily greater than that required to be supplied for the engagement sense.

An embodiment according to the invention is diagrammatically illustrated in the accompanying drawings.

In the single figure of these drawings, the clutch 1 is controlled by a piston 2 movable in a cylinder 3 which receives a hydraulic medium at a pressure which varies according to the speed of the engine.

The regulation of the pressure of the hydraulic medium is effected by the action of a device which comprises a body 4 in which is slidably supported a slide-valve 5 held in equilibrium between two opposing forces, developed on the one hand by the springs 6 and 7, and on the other hand, by the springs 8.

The apparatus further comprises a centrifugal regulator bjected to the action of the springs 6 and 7. The arms of the regulator are mounted on a sliding sleeve 23 and are coupled by crank-arms 24 to a fixed bearing member 25, the spring 6 being mounted between this member and the bottom of the sleeve 23, in the vicinity of the pivotal points of the arms. The sleeve carries a thrust block 26 which is adapted to contact with the extremity 28 of the slide-valve 5. The spring 7, inside a tubular member 27 on which slides the sleeve 23, is supported on the one hand on the bottom of the sleeve 23, and on the other hand against the head of a rod 29, the position of which is adjustable by the screw 30.

The spring 7 only acts as an additional external adjustment member.

The spring 8 is located in a chamber 20 of the body 4 of the device, and is supported against the bottom of a thrust member 17 and on a cup 12, on the base of which rests the rod 10' of a piston 10 which has a chamber 18 in communication with the conduit 19 and the pipe $19^1$ which leads to the hydraulic braking system $19^2$. The piston 10 is movable in the cylinder $10^2$, and a spring 9 is mounted between the bottom of the piston 10 and the bottom 21 of the cylinder $10^2$.

The spring 9 serves to maintain the member 10 in abutment on the bottom 11 of the cylinder $10^2$, which means that the spring 8 has a well defined abutment position against the flange of the member 12.

The portion of the body of the device which receives the slide-valve 5 is connected at 13 to the high pressure source (not shown) by the pipe $13^1$, at 14 to the exhaust by the pipe $14^1$, and at 15 to the de-clutching cylinder 3 by the pipe $15^1$. There is also a communication duct 16 between the supply zone of fluid for the de-clutching cylinder and the chamber 20 of the body 4 in which the spring 8 is housed.

The operation of the device is as follows:

At rest, the equilibrium of the slide-valve 5 is such that the high pressure source can deliver liquid to the de-clutching cylinder via the pipe $13^1$, the slide-valve 5 and the pipe $15^1$; the piston 2 is moved towards the left in the drawing under the action of the pressure fluid in cylinder 3 tending to cause de-clutching of the clutch 1. Simultaneously, pressure fluid is supplied through 16 to the chamber 20, which tends to push the slide-valve 5 towards the left by means of pressure on the push-rod 17, against the action of the springs 6 and 7. The clutch 1 therefore is de-clutched.

When the de-clutching pressure is reached, the slide-valve will have been moved by a distance sufficient to interrupt the incoming pressure fluid and the transmission remains de-clutched.

When the engine is started-up, it drives the centrifugal regulator, the action of which is in opposition to that of the springs 6 and 7, which means that the springs are compressed and that the sleeve 23 is moved towards the left.

The force applied to the slide-valve 5 by these two springs is reduced by the force applied by the regulator, and the slide-valve is moved towards the left allowing the clutch chamber 3 to exhaust via pipe 15', slide valve 5 and line 14'. The piston 2 moves progressively towards the right as and when the liquid flows, and the clutch engagement is carried out at an increasing pressure. Simultaneously, the chamber 20 is exhausted as pressure fluid flows through line 16, valve 5 and line 14' to exhaust.

The springs are designed and adjusted in order that, at a predetermined speed of the engine, for example 1200 r.p.m., the de-clutching force is reduced to zero.

It should be observed that the position of the slide-valve during this phase of action is determined by the strength of the three springs, 6 and 7 on one side and 8 on the other, by the force applied by the centrifugal regulator, and by the residual pressure in the chamber 20 which, as has already been stated, is equal to the pressure in the de-clutching cylinder. Thus, there effectively exists a curve of equilibrium between these various factors, and the de-clutching can be regulated following a pre-determined law.

When the vehicle is braked, the braking pressure, acting in the chamber 13, pushes back the piston 10 against action of the spring 9 and brings it into abutment against the bottom 21 of the cylinder. The cup 12 comes into the position 12¹, (indicated by dotted lines), thus removing load from the spring 8, so that a higher speed of the regulator will be necessary to ensure the same position for the slide-valve 5.

This difference has the effect of producing a more rapid de-clutching when the brakes are applied and thus permits a better operation of de-clutching at the time of braking.

It will of course be understood that the centrifugal regulator described and shown is only one example of construction given without any limitation. Any other centrifugal regulator device which complies with the above necessary operating conditions of the apparatus may be employed.

I claim:

1. In a motor vehicle having a source of fluid under pressure, a clutch and a braking system, means responsive to the pressure of fluid for actuating the clutch and braking systems, distributor means connected to the source of fluid under pressure, a return line, a line leading to the clutch actuating means, the improvement comprising: a centrifugal regulator controlling the distributor means to regulate the pressure fluid distributed to said clutch actuating means via said line leading thereto, at least one spring opposing the action of the regulator on the distributor means, and means responsive to the pressure in the brake system and acting upon said spring to decrease the force exerted thereby as a function of the braking pressure to consequently increase the pressure at the clutch actuating means, said distributor means including a slide-valve, a second spring acting on said slide-valve and controlled by the centrifugal regulator, an auxiliary spring also acting on said slide-valve and a member coupled to the auxiliary spring for manually controlling the force thereof, said one spring also acting on said slide-valve and in opposition to the other springs, a chamber, in the distributor means in which is supported said one spring, said slide-valve extending into the chamber and a connecting circuit establishing communication between the clutch actuating means and the chamber.

2. A device as claimed in claim 1 wherein said one spring has opposite ends, an abutment member engaging one of said ends, said abutment member being adapted for contacting said slide-valve, the other end of said one spring being remote from said slide valve, means engaging said other end of said one spring and in communication with the means which is responsive to the pressure in the braking system, the last said means comprising a piston subjected to the pressure of the braking system, a rod on said piston and extending into the chamber containing said one spring, and a collar on said rod engaging the said other end of said one spring.

References Cited in the file of this patent

UNITED STATES PATENTS 2,323,207    Eaton _____ June 29, 1943